United States Patent [19]
Holden et al.

[11] 3,802,880
[45] Apr. 9, 1974

[54] PHOTOCONDUCTIVE ZINC OXIDE COATING CONTAINING CALCINED CLAY

[75] Inventors: Jean Holden, Wheaton; Frank W. Mellows, Adelphi, both of Md.

[73] Assignee: Westvaco Corporation, New York, N.Y.

[22] Filed: May 31, 1972

[21] Appl. No.: 258,461

[52] U.S. Cl............ 96/1.8, 106/288 B, 106/308 Q, 162/181 D
[51] Int. Cl............................................. G03g 5/00
[58] Field of Search............ 96/1.5, 1.8; 162/181 D

[56] References Cited
UNITED STATES PATENTS

| | | | |
|---|---|---|---|
| 3,378,371 | 4/1968 | Jarvis | 96/1.8 |
| 3,079,253 | 2/1963 | Grieg | 96/1.5 X |
| 3,522,041 | 7/1970 | Staley | 96/1.8 |
| 3,674,477 | 7/1972 | Carlson | 96/1.8 |
| 3,607,363 | 9/1971 | Sadamatsu et al. | 96/1.8 X |
| 3,586,523 | 6/1971 | Faneslow et al. | 162/181 D X |

FOREIGN PATENTS OR APPLICATIONS

| | | | |
|---|---|---|---|
| 639,318 | 4/1962 | Canada | 96/1.8 |
| 4,219,750 | 4/1967 | Japan | 96/1.8 |
| 715,500 | 8/1965 | Canada | 96/1.8 |

*Primary Examiner*—Roland E. Martin, Jr.

[57] ABSTRACT

An economical and improved photoconducting coating for an electrophotographic paper is disclosed which contains photoconductive zinc oxide dispersed in an insulating binder and applied to an electroconductive base sheet wherein the photoconducting coating includes as an extender for the photoconductive zinc oxide a low cost nonconductive white pigmentary material selected from the group consisting of ground naturally occurring calcium carbonates, precipitated calcium carbonates, calcined clays having no additional treatment, or calcined clays treated to make them organophilic.

4 Claims, No Drawings

PHOTOCONDUCTIVE ZINC OXIDE COATING CONTAINING CALCINED CLAY

SUMMARY OF INVENTION

This invention relates to an economical and novel photoconducting coating for electrophotographic paper. In particular, the invention relates to a photoconducting coating which includes a novel combination of photoconductive zinc oxide dispersed in an insulating binder, and a nonconductive extender material for the photoconductive zinc oxide.

Because of its photoelectric properties, photoconductive zinc oxide is used in the preparation of coatings for substrates which are in turn used for the production of electrophotographic images. These coatings generally contain in addition to the photoconductive zinc oxide, suitable binders, solvents and dyes for sensitizing the zinc oxide in the desired regions of the spectrum. There are many grades of photoconductive zinc oxide available for photoconducting coatings having different light sensitivity and charge acceptance. In general, the smaller particle size zinc oxides (on the order of from 0.2 to 0.3 micron) have reduced speed and increased charge acceptance. Thus the different zinc oxides may be used as single grades, but more often they are used as blends of several different grades to obtain the desired combination of speed and image density for a particular copy machine.

The dyes used in photoconductive zinc oxide formulations to sensitize the zinc oxide to visible light are many and varied. Photoconductive zinc oxide in its normal state is sensitive only to UV light and to a small extent to the blue edge of the visible spectrum. Generally more than one dye is used in each formulation to extend the sensitizing region of the zinc oxide over a large portion of the visible spectrum thus allowing production of a neutral colored sheet. However, although the speed or light response of photoconductive zinc oxide coatings may be increased simply by adding more sensitizing dyes, in actual practice, the amount of dye that can be added is limited by brightness specifications for the sheet.

Finally, there are a wide range of chemical types of binders used, including copolymers and blends of styrene, vinyl acetate, acrylics and alkyds. Although there is a strong interaction between pigment and binder, little is understood of the mechanisms involved. The binder resins are known to alter drastically such electrophotographic properties of a photoconductive zinc oxide coating as (1) charge acceptance, i.e., the electrical potential of the zinc oxide layer when corona charged, (2) dark decay, i.e., charge leakage in the dark, and (3) light decay, i.e., charge dissipation upon light exposure. Moreover, electrophotographic binders whether used singly or more commonly as blends, must also possess the required physical properties to minimize curl, resist attack by liquid toner systems and have good adhesion properties. It has been found that increasing the binder content in a photoconducting coating not only increases the materials cost, but also causes a decrease in speed for a sheet of equal brightness.

Subsequently, the coatings are applied to substrates or base sheets which are preferably made electroconductive and which conventionally comprise cellulosic paper or other fibrous material. To produce the electrophotographic images, the photoconductive coatings or layers on the electroconductive substrates are electrically charged and then image-wise exposed to permit the charges to be dissipated in the exposed areas corresponding to the light exposure. Thus, an electrostatic image or pattern of electrostatic charges is formed and the image is then made visible with the aid of a powdered, liquid or aerosol toning system which is attracted to the image areas of the sheet.

The zinc oxide coatings generally chosen for the photoconducting coating layers should have the highest possible light sensitivity and the lowest possible dark conductivity. The high light sensitivity is desirable so that imaging light sources of low intensity and short exposure times may be used. The dark conductivity should be as low as possible so that no appreciable decrease in charging will occur during the period of time which is necessary for making the latent image visible. Thus it may be appreciated that it is extremely important to use a photoconductive material which is relatively pure and which does not become contaminated upon application to the conductive substrate.

As an example of the contamination mentioned above, it is known that cellulosic or other fibrous base sheet materials suffer from the disadvantage that electroconductive material from the base sheet can migrate into the photoconductive coating layer. In addition, the electroconductive material from the base sheet can strike through the bottom surface thereof and transfer to the photoconductive coating layer of the sheet next beneath it when the sheets are stacked for storage or use. Thus, the presence of low concentrations of electroconductive or ionic materials in or on the photoconductive coating layer lessens the effectiveness of the latter causing reduced contrast in the image produced. Accordingly, because of these factors, it was surprising to find that a substantial portion of the photoconductive zinc oxide in a photoconducting coating could in fact be directly replaced with one of the extender materials disclosed herein without any purification treatment, and not seriously affect the performance of the sheet.

Moreover, as noted hereinbefore, it is conventional in the manufacture of an electrophotographic sheet to add to the photoconductive zinc oxide/binder mixture certain sensitizing dyes to sensitize the zinc oxide particles in a band of wavelengths to which the normal zinc oxide particles are substantially insensitive. The sensitizing dyes are believed to be adsorbed on the surfaces of the photoconductive zinc oxide particles. This mechanism insures that during exposure, the radiant energy incident upon the zinc oxide/binder layer, to which the normal zinc oxide particles are substantially insensitive, will be absorbed by the adsorbed dye molecules. Finally, this absorbed energy is then transferred with more or less efficiency to the zinc oxide particle thereby increasing the electrical conductivity thereof. Thus, the dye tends to broaden the light absorption band of the photoconductive zinc oxide. However, some of the more efficient sensitizing dyes impart undesirable color hues to the electrophotographic sheet itself. Accordingly, another surprising result obtained with the photoconductive zinc oxide extenders described herein was the production of an electrophotographic sheet having superior brightness and stability.

Another, and even more significant result achieved in accordance with the present invention was the discovery that a significant fraction of the photoconductive zinc oxide in the photoconducting coating could be replaced with a non-photoconductive pigment and still give a commercially acceptable print.

Although several attempts have been made by pigment producers to introduce other photoconductive pigments into the electrophotographic paper market to compete with zinc oxide, the latter is still the only photoconductive pigment being used.

Accordingly, the present invention was developed as a result of a research effort directed toward the replacement of a significant fraction of photoconductive zinc oxide in photoconductive coatings with an extender material to either realize a significant decrease in coat weight or a reduction in materials cost. Based on this research effort, it was discovered that at least two different classes of nonphotoconductive white, pigmentary materials could be incorporated into the photoconductive zinc oxide coating without significantly changing the electrophotographic properties of the sheet. Further work illustrated that the addition of a solvent soluble wax having a high acid value, to the extended electrophotoconductive coating, insured that the coatings would perform well even at high relative humidity (85 percent).

The two general types of pigments that were found to be useful in the present invention include calcined clays, including those having no further treatment and those treated to make them organophilic, and chalks, or calcium carbonates, including both natural and precipitated types. Examples of the first general type of pigment are Satintone No. 1, supplied by Engelhard Minerals & Chemicals Company, Glomax HE, a Georgia Kaolin Company clay and Freeport OX-2, supplied by the Freeport Kaolin Company. Examples of the second general type of extender pigment which were found to be acceptable are Gamaco chalk, supplied by the Georgia Marble Company, Atomite, a chalk supplied by Thompson, Weinman and Company, Purecal O, a precipitated chalk supplied by BASF Wyandotte Corporation, and Mississippi M-60, a precipitated chalk supplied by the Mississippi Lime Company.

DETAILED DESCRIPTION

Photoconductive zinc oxide costs about 20 cents/lb. and electrophotographic binders cost generally between 70 and 90 cents/dry lb. Thus, a sheet of electrophotographic paper (11 X 8–½) containing nominally 20 lbs. of photoconductive zinc oxide and 3 lbs. of binder per 3,300 sq. ft., contains on the order of 0.08 cent worth of zinc oxide and 0.05 cent worth of resin for a total cost of about 0.13 cent per sheet. Therefore, based on the cost analysis noted above, the present invention was developed in an effort to determine whether photoconductive zinc oxide could be extended or diluted with a non-photoconductive pigment to achieve a product with either a performance or economic advantage.

Replacement of a part of the resin binder with low cost non-electrofax resins such as the homopolymer styrene, at 15-20 cents/lb. was evaluated, however it was found that such a replacement impaired both the physical and electrophotographic properties of the sheet to an undesirable extent. Then it was decided to attempt to replace a part of the photoconductive zinc oxide itself with low cost non-conductive white pigments such as the chalks and clays disclosed herein costing in the range of from 1 to 4 cents/lb. It was not known whether a significant fraction of the photoconductive zinc oxide could be substituted for, with a non-photoconductive pigment, and still yield a commercially acceptable print.

A first requirement of the extender pigment was that the pigment would have to behave like an insulator. That is, the non-light sensitive extender pigment in juxtaposition with the photoconductive zinc oxide particles would preferably accept and retain a charge. A second, and more demanding requirement of the extender pigment was that the pigment would have to lose its charge when the nearby photoconductive zinc oxide pigment particles became conductive. One could well have expected the extender pigment particles to retain their charge and thus cause the photoconducting layer to retain a significantly high residual charge after light exposure, and therefore, give poor quality prints with a dirty background. However, as disclosed herein, the contrary results were obtained when commercially acceptable prints were made even when using unusually high levels of the non-photoconductive extender pigments disclosed with the photoconductive zinc oxide.

The results of the research may be briefly summarized as follows. Actual print tests were made using a commercial copy machine with many photoconductive zinc oxide coatings containing substantial amounts of low cost white extender pigments. Several natural and precipitated chalks, and several calcined (both treated and nontreated) clays gave results from the more than twenty different white extender pigments used. The best performing pigments found include Atomite, a ground, naturally occurring calcium carbonate pigment material supplied by Thompson, Weinman and Company, and having an average particle size of 2.5 microns and a water content of 0.2 percent; Gamaco chalk, supplied by the Georgia Marble Company, in the form of a ground natural anhydrous calcium carbonate pigment with no surface treatment, with an average particle size of 1.6 microns and a specific gravity of 2.71; Glomax HE, a Georgia Kaolin Company product in the form of a calcined clay having no additional treatment, and having an average particle size of 1.2 microns, specific gravity of 2.63 and a maximum water content of 0.5 percent; Satintone No. 1, supplied by Engelhard Minerals & Chemicals Corporation in the form of a calcined clay having no additional treatment, with an average particle size of 1.2 microns, specific gravity of 2.63 and a maximum water content of 0.5 percent; and Freeport OX-2, a product of the Freeport Kaolin Company in the form of an organophilic treated calcined clay. The precipitated chalks that were tested included the Purecal O product of BASF Wyandotte Corporation in the form of a precipitated calcium carbonate having a particle size of between 0.10–0.35 micron, and the Mississippi M-60 product of the Mississippi Lime Company, another precipitated calcium carbonate product of a particle size between 0.70–1.5 micron. However, the precipitated chalks were not classified as being best performers since the prints obtained with the extended coatings containing precipitated chalks showed a substantial reduction in speed. It is not understood why the precipitated chalks did not perform as well as the natural chalks and the calcined clays, however, it is known that both the natural calcium carbonates and the calcined clays are generally larger in particle size than the precipitated calcium carbonates and it may be theorized that the difference in particle size along with the fact that the precipitated calcium carbonates may have contained low levels of occluded soluble salts contributed to their performance.

It was observed that the calcined clays gave better speed than the ground natural chalks for sheets of equal brightness, but the clay-extended zinc oxide coatings tended to flake because of the high adhesive demand of the clays. However, it was found that the flaking problem was minimized by increasing the binder level or by more careful selection of resins with exceptional adhesive properties. In addition, blends of natural chalks and calcined clays were found to be useful in offsetting the tendency of the straight clay extended coating to flake.

As regards print quality, all of the best performing extender pigments tested performed adequately in the humidity range of from 15–50 percent. At higher humidities (up to 85 percent), it was found necessary to add a small quantity of a wax or fatty material to at least one system in order to get a satisfactory print. For this purpose Hardwax EDM, a polyvinyl ether wax of low melting point (53–54 deg. C.) and an acid value of from 72–76, manufactured by Dura Commodities, was found to be suitable. Of course, other wax materials having a high acid value would be expected to perform equally well. In this regard, stearic acid was found to improve the image density of some extended systems.

With respect to the extender pigments tested in developing the invention herein, the best performing pigments may be generically classified as either a calcined clay or a natural ground calcium carbonate without surface treatment. Furthermore, based on the results obtained, it may be said that the superior properties of extended zinc oxide coatings containing either of the above noted classes of pigments indicates that the preferred extender pigments for use in photoconducting coatings should have both a low water content and no hydrophilic treatment that would cause a large reduction in charge acceptance of the coating.

It was discovered that the good extender pigments, i.e., the calcined clays and the non-surface treated natural chalks, could be employed in the photoconductive zinc oxide coatings in amounts up to 75 percent by weight. However, best results were obtained by using from 10 to 30 percent by weight based on the weight of the zinc oxide. Moreover, it was found that at the 25 percent substitution level, the pigment volume of the calcined clays and the natural chalks was approximately 50 percent of the total pigment in the system because of the difference in the respective densities of the zinc oxide pigment and the extender pigments. In addition, it was found that the extended photoconductive zinc oxide coatings of the present invention could be made up from any conventional dispersion of photoconductive zinc oxide and applied to the substrate with conventional apparatus using normal techniques.

The following specific examples are intended to illustrate more fully the nature of the invention without acting as a limitation on its scope.

EXAMPLE I

For the purpose of demonstrating the surprising results obtained by extending a more-or-less conventional photoconductive zinc oxide coating with various commercially available chalks, a control formulation was prepared substantially as follows. Photox 80 zinc oxide and a blend of two commercially available Electrofax resins, viz., a modified vinyl acetate and an acrylic were mixed togehter in a resin to pigment ratio of 15 to 100. To this mixture there was added a dye system comprised of Uranine and Bromophenol Blue and the ingredients were mixed with a suitable solvent and thoroughly dispersed in a Kady mill to obtain the desired fineness of grind.

The coating thus prepared was then applied to a conductive cellulosic basestock with adequate solvent holdout at 18–20 lbs. per ream (3,300 square feet) and sheets were prepared to be used as a control.

Additional coatings were then prepared substantially as set forth above, except that in each case, part of the photoconductive zinc oxide (Photox 80 zinc oxide) was replaced with one of the chalks noted, and these coatings were applied to the same basestock noted above. Prints were then made using each of the coatings on an SCM Model 33 copy machine at 50 percent RH and 85 percent RH after conditioning the sheets at least 16 hours. The print quality was observed visually and given a rating ranging from 1 to 10 based on the image density. In each case, although the description of image density was made on a purely subjective basis, it should be noted that the comparisons and evaluations were made by the same person after he had acquired considerable experience in previous tests.

TABLE I

Print Performance – Chalk Extenders

| Sample | Image Density – 1 | | Speed – 2 | |
|---|---|---|---|---|
| | 50% RH | 85% RH | 50% RH | 85% RH |
| 100% ZnO (control) | 8 | 6 | 6 | 6½ |
| 75% ZnO + 25% Gamaco | 8 | 5 | 7 | 7 |
| 75% ZnO + 25% Atomite | 8 | 5 | 7 | 7 |
| 75% ZnO + 25% Purecal O | 7 | 3 | 7 | over 9 |
| 75% ZnO + 25% Mississippi M-60 | 7 | 4 | 9 | 9 |

1–Image density rating made visually on ¼ inch diameter solid black dot (1 = worst, 10 = best).
2–Speed is lowest shutter setting on SCM Model 33 copier that gave a print with a clean background. (Higher numbers = Poorer light response).

The results of the tests noted in Table I for the chalk extenders at the 25 percent level indicate that at both the 50 and 85 percent RH levels, equivalent prints were obtained with the naturally occurring ground calcium carbonates, Gamaco and Atomite. The two precipitated chalks noted (Purecal O and Mississippi) were each marginal in performance and later experiments were accordingly concentrated on the natural chalks.

An additional feature observed particularly with the extended coating containing Gamaco chalk was a noticeable reduction of white speckles in the black areas of the image as compared with other extended coatings. Of course, as indicated in the Table, there was some tendency of the coatings extended with each of the chalks to suffer a decrease in speed, and although this tendency did not unduly effect the print quality, the explanation of this characteristic was investigated. Based on the investigation, it was suggested that the decrease in speed found in the coatings extended with chalk could in part be due to a competition between the zinc oxide and the chalk for adsorption of the sensitizing dyes. This explanation was deemed proper since if the dyes became adsorbed on the chalk, they could not act as sensitizers.

However, based on the good performance in print quality obtained with the Gamaco chalk, additional coatings were prepared to determine the effect on print quality with variations in the level of substitution of the Gamaco chalk.

EXAMPLE II

Five coatings were prepared substantially as set forth in Example I using different levels of substitution of Gamaco chalk to the standard zinc oxide formulation and after applying the coatings to substantially the same conductive basestock used in Example I, print tests were made as before.

TABLE II

Print Performance – Gamaco Chalk

| Sample (% substitution Gamaco chalk) | Image Density 50% RH | Speed 50% RH |
| --- | --- | --- |
| 0% (control) | 8 | 6 |
| 15% | 8 | 6½ |
| 25% | 8 | 7 |
| 30% | 7 | 7 |
| 50% | 6 | 9 |
| 75% | 3 | over 9 |

The results of these tests indicated that at a 75 percent level of substitution only a marginally acceptable copy could be obtained on the SCM Model 33 copier. However, at the 50 percent level of substitution, a clear print having good image density and a clean background was obtained. Thus the most serious drawback found by extending the zinc oxide coatings with Gamaco chalk was a reduction in the speed of the coating as the level of substitution of chalk was increased.

For the purpose of offsetting the loss in speed at high RH of the coatings extended with chalks, another experiment was performed using a different resin system that had previously shown good speed performance at high humidity.

EXAMPLE III

A control zinc oxide coating formulation containing photox 80 ZnO and DeSoto E-216 Electrofax resin was mixed in a resin to pigment ratio of 15 to 100. To this mixture there was added a dye system comprised of 1.4 ml. Bromophenol Blue and 2.4 ml. Uranine in a 0.5 percent methanolic solution based on 200 g. of pigment.

The coating thus prepared was then applied to a conductive basestock substantially as described in Example I and sheets were prepared for print tests.

For the extended coating, the same zinc oxide, dye system and resin set out above was used except that part of the photoconductive zinc oxide (Photox 80) was replaced with Gamaco chalk and this coating was applied to the same conductive basestock mentioned above and sheets were prepared for the print tests.

TABLE III

Print Performance - Gamaco Chalk

| Sample (% substitution Gamaco chalk) | Image Density 50% RH | Image Density 85% RH | Speed 50% RH | Speed 85% RH |
| --- | --- | --- | --- | --- |
| 0% | 8 | 7 | 4 | 5 |
| 40% | 8 | 6 | 5 | 6½ |

Accordingly, as noted in Table III, with the different resin system DeSoto E-216, the non-extended zinc oxide coating formulation showed a substantial increase in speed as compared with the control used in Examples I and II. In addition, with 40 percent Gamaco chalk in the extended zinc oxide coating, the speed performance was only slightly reduced from the control, and was a great deal better than the speed performance of the extended coatings tested in Examples I and II. Thus, it became clear that the use of Gamaco chalk as an extender for a photoconductive zinc oxide coating was quite feasible since any decrease in speed suffered because of the presence of the chalk in the coating was easily offset with the use of a different resin system having good speed performance at high humidity.

EXAMPLE IV

For the purpose of demonstrating the surprising results obtained by using various commercially available calcined clays as extenders for photoconductive zinc oxide coatings, a control formulation and several extended coating formulations were prepared as follows. The control was substantially as used in Example I with Photox 80 ZnO and a mixed resin blend. For each of the extended coatings, different clays were substituted for the ZnO at the 25 percent substitution level.

Subsequently the different coatings were applied to a conductive basestock at the 18–20 lbs. per ream (3,300 square feet) coat weight used in Example I, and sheets were prepared and conditioned for print testing.

TABLE IV

Print Performance – Clay Extenders

| Sample (% clay substitution) | Image Density 50% RH | Image Density 85% RH | Speed 50% RH | Speed 85% RH |
| --- | --- | --- | --- | --- |
| 0% (control) | 8 | 5 | 6 | 6 |
| 25% Glomax HE | 8 | 3 | 7 | over 9 |
| 25% Freeport OX-2 | 7 | 5 | 6 | 6 |
| 25% Satintone 1 | 7 | 4 | 7 | 8 |

As before, the print tests were evaluted visually and given a rating from 1 (worst) to 10 (best) at a speed which gave a good print on clean background. The results show for 50 percent RH, little if any change in either speed or image density for the extended coatings as compared with the control. At 85 percent RH, the prints were found to have a lower image density and a reduction in speed performance except the Freeport OX–2 extended coating appeared to yield results nearly equivalent with those obtained by the control.

Based on these results, another experiment was conducted using the Freeport OX–2 organophilic treated calcined clay at different levels of addition.

EXAMPLE V

For this test, the photoconductive zinc oxide coating formulation prepared in Example IV was substituted with levels of Freeport OX–2 clay at 5 percent, 15 percent, 25 percent and 40 percent to determine the effect on print performance. As before, each of the coatings were then applied to a conductive basestock and sheets made for print testing.

TABLE V

Print Performance – Freeport OX–2 Clay

| Sample % substitution Freeport OX–2 | Image Density 50% RH – 85% RH | | Speed 50% RH – 85% RH | |
|---|---|---|---|---|
| 0% (control) | 8 | 5 | 5 | 6 |
| 5% | 8 | 5 | 5 | 6 |
| 15% | 7 | 5 | 5½ | 6 |
| 25% | 7 | 5 | 6 | 6 |
| 40% | 6 | 5 | 7 | 7 |

Thus, based on the results set forth in Table V, print performance and speed remained relatively the same up to a 40 percent level of substitution of Freeport OX–2 clay. Accordingly, it was concluded that among the calcined clays tested, Freeport OX–2 was the most efficient extender pigment available.

However, one adverse effect that was noted with the use of the calcined clays as extenders for photoconductive zinc oxide coatings was the tendency of the clay extended coating to flake off the sheet when the sheet was crumpled either before or after printing. The reason for the problem was attributed to the resin-to-pigment ratio used in conjunction with the high adhesive demand of the calcined clays because of their high surface areas. Subsequent evaluation of several different resin systems at different resin additions illustrated that the flaking could be reduced by either increasing the resin-to-pigment ratio or by using more flexible binders as the adhesive.

To offset the flaking tendency of the clay extended coatings and to determine if the performance of either a clay or chalk extended coating could be improved by mixing the two extenders, an additional experiment was conducted using Satintone 1 calcined clay and Gamaco chalk.

EXAMPLE VI

A control photoconductive coating formulation was prepared substantially as set forth in Example III (with DeSoto E–216 Electrofax resin and a modified vinyl acetate), and several extended coatings were also prepared with levels of substitution as follows: 25 percent Gamaco, 25 percent Satintone No. 1, and 12-½ percent Gamaco — 12-½ percent Satintone No. 1.

TABLE VI

Print Performance – Combined Extenders

| Sample (% substitution of extender) | Image Density 50% RH – 85% RH | | Speed 50% RH – 85% RH | |
|---|---|---|---|---|
| 0% – 0% (control) | 8 | 5 | 4½ | 6 |
| 25% Gamaco | 8 | 5 | 5 | 7 |
| 25% Satintone #1 | 7 | 4 | 6 | 7 |
| 12-½% Gamaco–12½% Satintone 1 | 8 | 5 | 5 | 6½ |

These results show that the mixture of extenders produces a print that is nearly as good as the control and at about the same speed, while offering distinct advantages over the non-mixed extenders. Moreover, the result of combining the two extenders produced a coating which had a lesser tendency to flake than the straight clay extended coating and the brightness of the mixed extender sheet was superior to the sheet having the straight chalk extender.

Later on, based on the observation of the good high humidity performance of the extended coating containing Freeport OX–2 clay (Example V), the clay was extracted and analyzed to determine the kind of treatment it had received. The analysis of the data obtained showed that Freeport OX–2 had been treated with a wax or a long chain fatty acid having a moderately high acid value. Thus it was concluded that for improved high RH performance, the addition of such a material to the other extender pigments might be desirable.

Accordingly, another experiment was conducted using as the pigment extender the previously marginally performing calcined clay Glomax HE (Example IV). It was felt that because Glomax HE had demonstrated the least satisfactory performance at high humidity (85 percent RH), it would offer the most challenging condition for improvement.

EXAMPLE VII

Based on our discovery that the addition of a wax or fatty material would improve the performance of the extended coatings at high humidity, a control photoconductive zinc oxide coating was prepared substantially as set forth in Example I and several extended coatings were prepared with Glomax HE at the 25 percent substitution level and with different levels of addition of Hardwax EDM, a polyvinyl ether wax of low melting point and an acid value of from 72–76, manufactured by Dura Commodities. Each of the coatings were then applied to the same conductive basestock previously used, and sheets were prepared and conditioned for the print performance evaluation.

TABLE VII

Print Performance – Glomax HE & Hardwax EDM

| Sample (% clay substitution) | Hardwax EDM (% addition) | Image Density 50% RH | Image Density 85% RH | Speed 50% RH | Speed 85% RH |
|---|---|---|---|---|---|
| 0% (control) | 0 | 8 | 4 | 4½ | 5½ |
| 0% (control) | 1½% | 7 | 5 | 3½ | 4 |
| 25% | 0 | 8 | 2 | 7 | 8 |
| 25% | 1% | 8 | 3 | 5½ | 8 |
| 25% | 2% | 8 | 4 | 4½ | 7 |
| 25% | 3% | 9 | 4 | 4½ | 6 |

From the above results, it is clear that the addition of increasing amounts of Hardwax EDM up to the 3 percent level showed increasing improvement in both the speed and print performance at high humidity although the image density at 50 percent RH remained substantially the same. It is also worth noting that at the 3 percent level of addition of Hardwax EDM, the image density obtained at 50 percent RH was superior to any previously found. Thus it may be concluded that even for the poorer performing extender pigments disclosed, the addition of a wax material having a high acid value would produce the improved print and speed qualities desired.

As a result of the experiments performed in developing the invention, certain observations were made. In this regard, with either the calcined clays or the natural chalks (or a mixture of the two materials) in an extended zinc oxide coating, the dye concentration could be reduced based on the total pigment content. This reduction in dye concentration was found to be possible while still maintaining a suitable brightness and a color balance in the sheet. The reason for these corrections was found to be a function of the low refractive indices of the extender pigments as compared with the refractive index of zinc oxide which produced a reduction in scattering coefficient for the coating. In addition, the presence of the extender pigments in the sheet caused some show-through of the off-white color of the basestock and a longer light path for light entering the zinc oxide layer.

In addition, it was also discovered that an addition of 0.25 percent based on pigment of zinc stearate improved the speed of the photoconductive coating containing 25 percent Gamaco chalk by 1 to 1-½ stops on the SCM Model 33 copier. At a coat weight of 23 lbs./ream, the print density, speed and color were equivalent to prints made with the non-extended formulation. Calcium stearate, aluminum stearate and stearic acid were also found to improve the speed of the extended coating containing Gamaco chalk.

Having thus described the invention herein, what is claimed and desired to be secured by Letters Patent is as follows.

We claim:

1. An electrophotographic recording element consisting of an electroconductive base material carrying a photoconducting insulating layer, said layer comprising an electrically insulating film forming binder and suspended in said film forming binder a mixture of photoconductive zinc oxide and a nonphotoconductive white pigmentary material, said nonphotoconductive pigmentary material being characterized as a good electrical insulator with the ability to dissipate an electrostatic charge and as having a water content not greater than 0.5 percent by volume and as being nonhydrophilic, and selected from the group consisting of calcined clays and organophilic treated calcined clays wherein said photoconducting insulating layer comprises at least 60 percent by weight of photoconductive zinc oxide and up to 40 percent by weight of the nonphotoconductive white pigmentary material based on the weight of the zinc oxide, said layer forming an electrostatic latent image when electrostatically exposed to a light source.

2. The electrophotographic recording element of claim 1 wherein the photoconducting insulating layer comprises by weight not more that 25 percent of the calcined clay material based on the weight of the photoconductive zinc oxide.

3. The electrophotographic recording element of claim 2 wherein the photoconducting insulating layer also comprises up to 3 percent addition of a polyvinyl ether wax having an acid value of from 72–76.

4. An electrophotographic recording element consisting of an electroconductive base material carrying a photoconducting insulating layer, said layer comprising an electrically insulating film forming binder and suspended in said film forming binder a mixture of photoconductive zinc oxide and a nonphotoconductive white pigmentary material, said nonphotoconductive pigmentary material being characterized as a good electrical insulator with the ability to dissipate an electrostatic charge and as having a water content not greater that 0.5 percent by volume and as being nonhydrophilic wherein said photoconducting insulating layer comprises at least 75 percent by weight of photoconductive zinc oxide and up to 25 percent by weight of the nonphotoconductive white pigmentary material based on the weight of the zinc oxide characterized in that the nonphotoconductive white pigmentary material consists of from 0 to 12-½ percent of a ground, naturally occurring calcium carbonate material of a particle size of between 1.6 and 2.5 microns and from 25 to 12-½ percent of an untreated calcined clay material.

* * * * *